United States Patent
Kim et al.

(10) Patent No.: US 9,417,499 B2
(45) Date of Patent: *Aug. 16, 2016

(54) MULTI-COLOR ELECTROPHORETIC DISPLAY DEVICE, IMAGE SHEET, AND MANUFACTURING METHOD THEREOF

(75) Inventors: Chul Hwan Kim, Daejeon (KR); Yong Eui Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 831 days.

This patent is subject to a terminal disclaimer.

(21) Appl. No.: 13/639,975

(22) PCT Filed: Mar. 25, 2011

(86) PCT No.: PCT/KR2011/002085
§ 371 (c)(1),
(2), (4) Date: Jan. 14, 2013

(87) PCT Pub. No.: WO2011/126229
PCT Pub. Date: Oct. 13, 2011

(65) Prior Publication Data
US 2013/0114125 A1    May 9, 2013

(30) Foreign Application Priority Data

Apr. 6, 2010    (KR) .................. 10-2010-0031585

(51) Int. Cl.
*G02B 26/00* (2006.01)
*G02B 26/02* (2006.01)
(Continued)

(52) U.S. Cl.
CPC .............. *G02F 1/167* (2013.01); *G02B 26/026* (2013.01); *G02F 1/172* (2013.01); *G09G 3/344* (2013.01); *G02B 26/08* (2013.01); *G02B 26/0816* (2013.01); *G02F 1/17* (2013.01); *G02F 2001/1678* (2013.01); *G02F 2201/52* (2013.01); *G09G 3/34* (2013.01)

(58) Field of Classification Search
CPC ...... G02B 26/00; G02B 26/026; G02B 26/08; G02B 26/0816; G02F 1/00; G02F 1/17; G02F 1/172; G02F 1/167; G02F 2001/1678; G02F 2201/52; G09G 3/34; G09G 3/344; G09G 2300/0439; G09G 2300/0443
USPC ......... 359/228, 245, 253, 290, 291, 295, 296; 345/55, 84, 107, 690; 430/319; 264/4
See application file for complete search history.

(56) References Cited

U.S. PATENT DOCUMENTS 6,864,875 B2 *   3/2005   Drzaic et al. .................. 345/107
7,502,162 B2 *   3/2009   Lin .......................... G02F 1/167
                                                          345/107

(Continued)

FOREIGN PATENT DOCUMENTS

KR      1020060124035 A      12/2006
KR      1020080029559 A       4/2008

(Continued)

OTHER PUBLICATIONS

International Search Report: mailed Nov. 25, 2011; PCT/KR2011/002085.

*Primary Examiner* — Loha Ben
(74) *Attorney, Agent, or Firm* — Birch, Stewart, Kolasch & Birch, LLP

(57) ABSTRACT

A multi-color electrophoretic display (EPD) device, an image sheet, and a method of fabricating the same. The multi-color EPD device includes: a plurality of unit color pixels; and a plurality of color capsules, each comprising color capsule shell which stores a dielectric fluid and at least one type of electrophoretic particles dispersed in the dielectric fluid, the plurality of color capsules being arranged to define subpixels of each of the plurality of unit color pixels.

20 Claims, 11 Drawing Sheets

(51) Int. Cl.
*G09G 3/34* (2006.01)
*G02F 1/167* (2006.01)
*G02F 1/17* (2006.01)
*G02B 26/08* (2006.01)

(56) References Cited

U.S. PATENT DOCUMENTS

| | | | |
|---|---|---|---|
| 7,675,502 B2* | 3/2010 | Chopra et al. | 345/107 |
| 7,862,866 B2* | 1/2011 | Lin | G02F 1/167 427/458 |
| 7,875,307 B2* | 1/2011 | Lin | G02F 1/167 427/203 |
| 8,830,562 B2* | 9/2014 | Kim et al. | 359/296 |
| 2010/0033805 A1 | 2/2010 | Lee et al. | |

FOREIGN PATENT DOCUMENTS

| | | |
|---|---|---|
| KR | 1020080052022 A | 6/2008 |
| KR | 20090020239 A | 2/2009 |
| KR | 10-0982206 B1 | 9/2010 |

\* cited by examiner

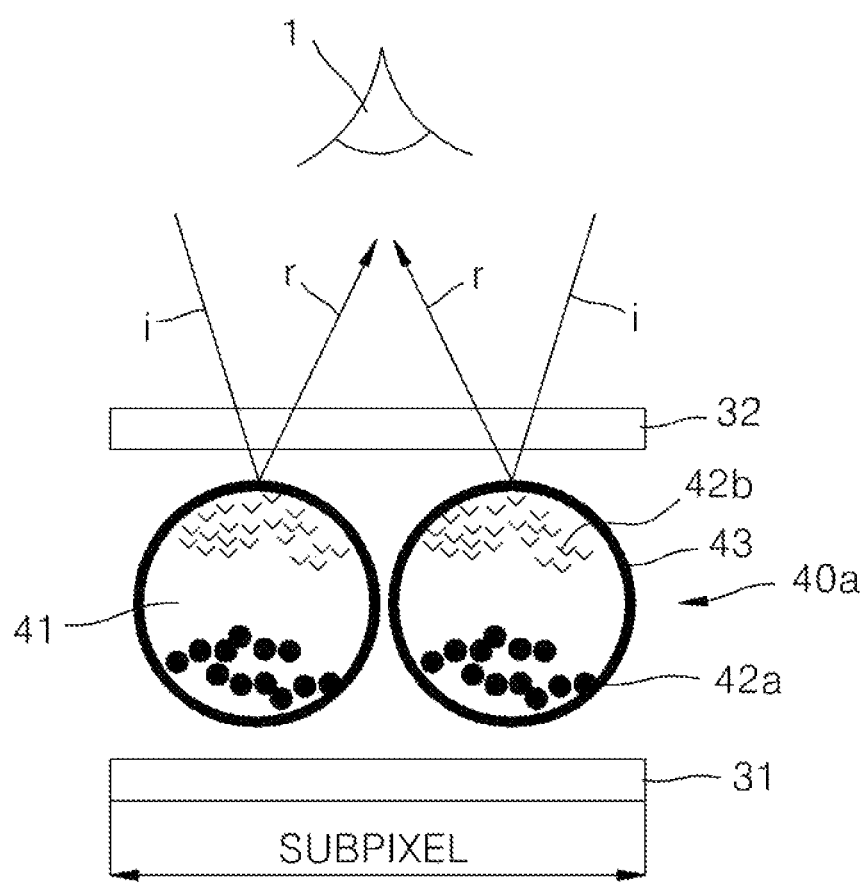

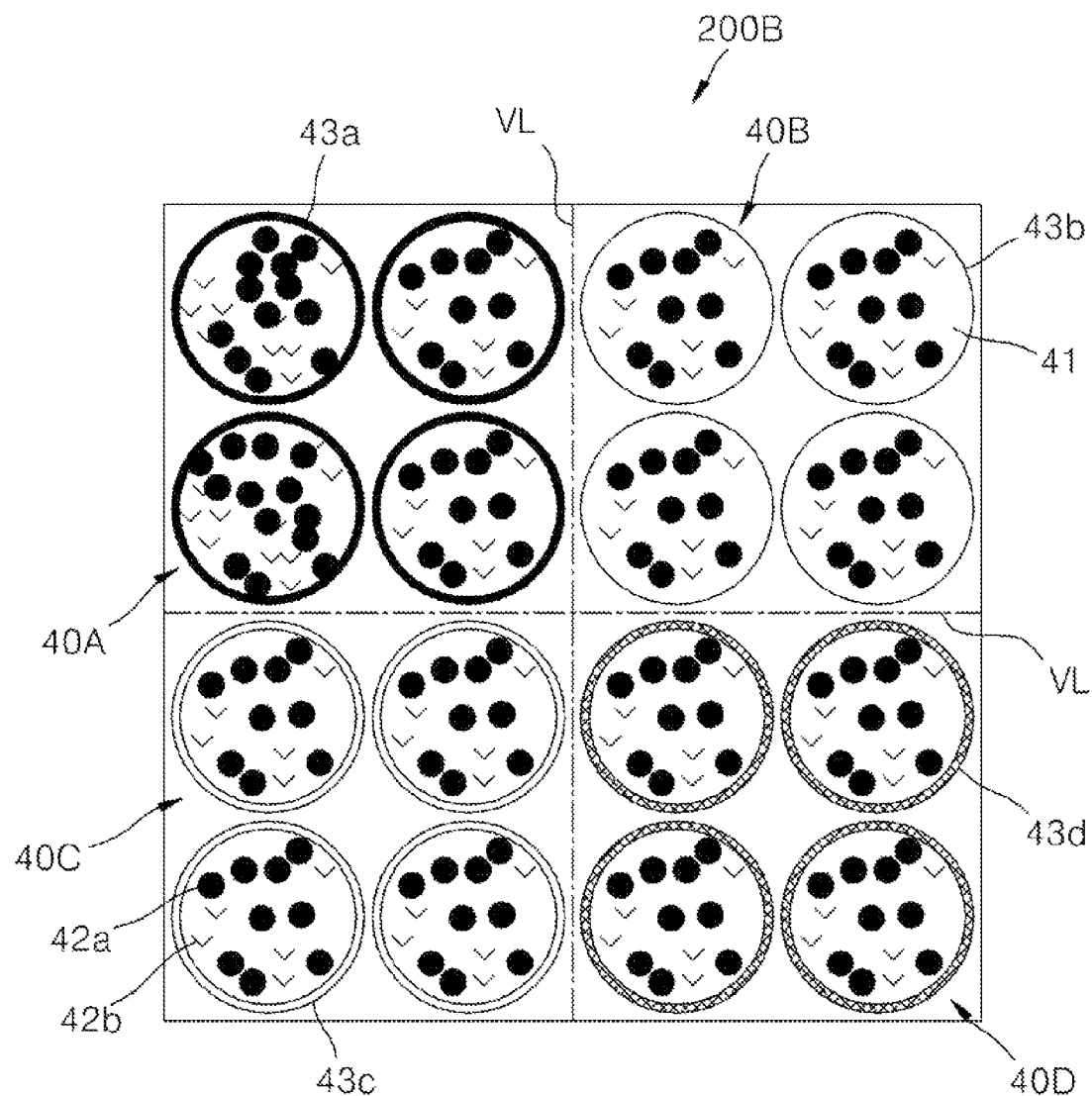

MULTI-COLOR ELECTROPHORETIC DISPLAY DEVICE, IMAGE SHEET, AND MANUFACTURING METHOD THEREOF

FIELD OF THE INVENTION

The present invention relates to a flat panel display device, and more particularly, to a multi-color electrophoretic display (EPD) device, an image sheet, and a method of fabricating the same.

BACKGROUND ART

As semiconductor fabricating technology and information communication technology have recently been developed, markets for electronic devices such as mobile phones, personal computers, visual entertainment systems, personal digital assistants (PDAs), and electronic books have expanded. Various flat panel display devices such as liquid crystal display (LCD) devices, field emission display (FED) devices, electrophoretic display (EPD) devices, and organic/inorganic electroluminescence devices are applied to such electronic devices.

Among these flat panel display devices, EPD devices are considered as next-generation display devices because they have a wide viewing angle and low power consumption, and may easily realize flexible display devices. There have been recent attempts to obtain multi-colors by applying a color filter to an EPD device. To this end, however, the color filter has to be fabricated and an additional process such as an additional process of aligning the color filter in the EPD device is required.

DISCLOSURE

Technical Problem

The present invention provides an electrophoretic display (EPD) device which may realize a multi-color display device without a color filter and may have high color saturation and high contrast.

The present invention also provides a method of fabricating the EPD device.

The present invention also provides an image sheet which may realize a multi-color display device without a color filter and may have high color saturation and high contrast.

The present invention also provides a method of fabricating the image sheet.

Technical Solution

According to an aspect of the present invention, there is provided a multi-color electrophoretic display (EPD) device including: a plurality of unit color pixels; and a plurality of color capsules that include color capsule shells each of which stores a dielectric fluid and at least one type of electrophoretic particles dispersed in the dielectric fluid, wherein the plurality of color capsules are arranged to define subpixels of each of the plurality of unit color pixels.

According to another aspect of the present invention, there is provided a method of fabricating a multi-color electrophoretic display (EPD) device including a plurality of unit color pixels, the method including: forming a plurality of color capsules that include capsule shells each of which stores a dielectric fluid and at least one type of electrophoretic particles dispersed in the dielectric fluid; and arranging the plurality of color capsules on a substrate to define subpixels of each of the unit color pixels.

According to another aspect of the present invention, there is provided an image sheet for a multi-color electrophoretic display (EPD) device, the image sheet including a plurality of color capsules that are disposed on a support substrate and include color capsule shells each of which stores a dielectric fluid and at least one type of electrophoretic particles dispersed in the dielectric fluid, wherein the plurality of color capsules are arranged to define subpixels of each of unit color pixels.

According to another aspect of the present invention, there is provided a method of fabricating an image sheet for a multi-color electrophoretic display (EPD) device, the method including: providing a support substrate; and arranging on the support substrate a plurality of color capsules that include color capsule shells each of which stores a dielectric fluid and at least one type of electrophoretic particles dispersed in the dielectric fluid to define subpixels of each of unit color pixels.

Advantageous Effects

Since a multi-color display device according to embodiments of the present invention switches light by using an electrophoretic layer including a plurality of color capsules, the multi-color display device may be realized without a color filter. Thus, the multi-color display device may have high color saturation and high contrast.

Also, an image sheet according to embodiments of the present invention may implement multi-colors without light loss due to a color filter.

BRIEF DESCRIPTION OF THE DRAWINGS

FIGS. 2A and 2B are cross-sectional views illustrating subpixels applicable to the EPD device of FIG. 1, according to embodiments of the present invention;

FIGS. 3A and 3B are top views illustrating unit color pixels in which three types of color capsules include capsule shells having different colors, according to embodiments of the present invention;

BEST MODE

Figure 1:
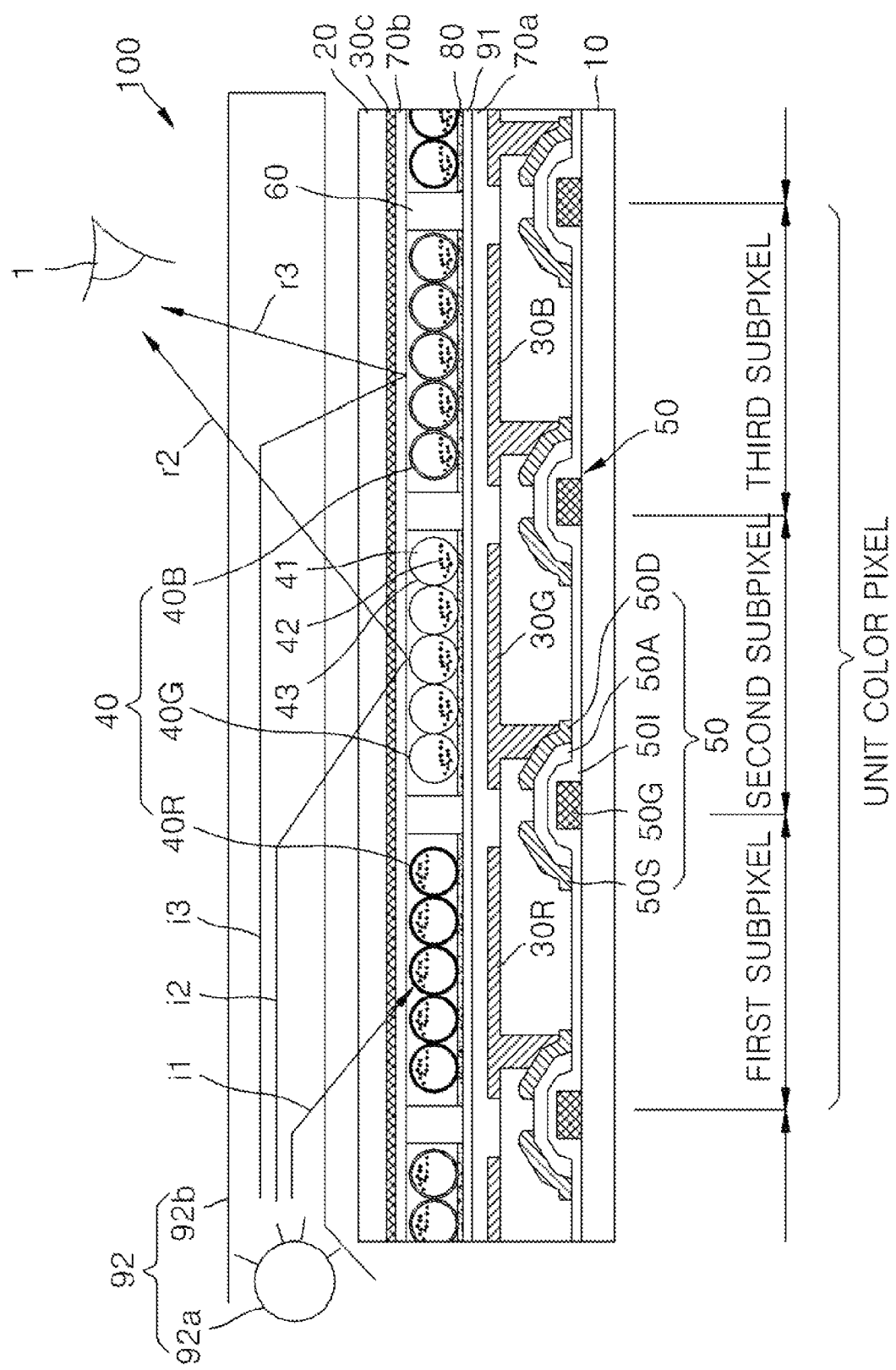
FIG. 1 is a cross-sectional view illustrating an electrophoretic display (EPD) device which is a multi-color EPD device, according to an embodiment of the present invention.

Hereinafter, exemplary embodiments will be described in greater detail with reference to the accompanying drawings.

Embodiments may take many different forms and should not be construed as being limited to those set forth herein. Rather, these embodiments are provided so that this disclosure will be thorough and complete, and will fully convey the concept of the invention to those skilled in the art.

In the drawings, lengths and sizes of layers and regions may be exaggerated for clarity. Like reference numerals in the drawings denote like elements. The term "and/or" used herein includes any one of listed items or a combination of two or more thereof.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or the group thereof, but do not preclude the presence or addition of one or more other features, integers, steps, operations, elements, components, and/or groups thereof.

It is also understood that when a layer is referred to as being "on" another layer or substrate, it can be directly on the other or substrate or intervening layers or layers formed in the intervening layers may also be present. It will be clearly understood by those skilled in the art that a structure or shape "adjacent to" another shape may have a portion overlapping the other shape or a portion below the other shape.

Spatially relative terms, such as "below", "above", "upper", "lower" "horizontal", or "vertical", may be used herein for ease of description to describe one element, layer, or region's relationship to another element(s), layer(s), or region(s) as illustrated in the figures. It will be understood that the spatially relative terms are intended to encompass different orientations of the device in use or operation in addition to the orientation depicted in the figures.

Exemplary embodiments are described herein with reference to drawings that are schematic illustrations of exemplary embodiments (and intermediate structures). As such, variations from the shapes of the illustrations as a result, for example, of fabricating techniques and/or tolerances, may be expected. Thus, exemplary embodiments should not be construed as limited to the particular shapes of regions illustrated herein but may be to include deviations in shapes that result, for example, from fabricating.

Structure and Operation of Multi-Color EPD Device

FIG. 1 is a cross-sectional view illustrating an electrophoretic display (EPD) device 100 which is a multi-color EPD device, according to an embodiment of the present invention.

Referring to FIG. 1, the EPD device 100 includes a first substrate (which may be a lower substrate 10) and a second substrate (which may be an upper substrate 20) that faces the lower substrate 10. At least one of the lower substrate 10 and the upper substrate 20, for example, the upper substrate 20, may be transparent, and the remaining substrate, that is, the lower substrate 10, may not be transparent. Alternatively, both the lower substrate 10 and the upper substrate 20 may be transparent.

Each of the lower substrate 10 and the upper substrate 20 may be a glass substrate, or may be formed of an inorganic material having a single crystalline structure or a polycrystalline structure. Each of the lower substrate 10 and the upper substrate 20 may be flexible. In this case, each of the lower substrate 10 and the upper substrate 20 may be formed of a resin-based material. For example, the resin-based material may be, but is not limited to, any one of a cellulose-based resin; a polyester resin such as polyethylene terephthalate (PET) or polyethylene naphthalate (PEN); a polyethylene resin; a polyvinyl chloride resin; polycarbonate (PC); polyether sulfone (PES); polyether etherketone (PEEK); and polyphenylene sulfide (PPS), or a combination thereof.

Electrodes facing to each other may be respectively formed on the lower substrate 10 and the upper substrate 20 to generate an electric field perpendicular to main surfaces of the lower substrate 10 and the upper substrate 20. For example, as shown in FIG. 1, when a unit color pixel of the EPD device 100 includes first through third subpixels, one or a plurality of pixel electrodes 30R, 30G, and 30B may be formed on the lower substrate 10 respectively for the first through third subpixels. Also, a common electrode 30c facing the pixel electrodes 30R, 30G, and 30B may be disposed on the upper substrate 20. Each of the first, second, and third subpixels may be a subpixel of any one color of red, green, blue, magenta, cyan, and yellow for the purpose of providing color display.

Although three subpixels constitute one unit color pixel in FIG. 1, the present embodiment is not limited thereto. For example, a unit color pixel may include two subpixels, or four or more subpixels including additional subpixels for displaying black and/or white in order to improve color rendition as will be described below.

Each of the pixel electrodes 30R, 30G, and 30B may have a pattern suitable for a passive or active matrix addressing scheme. FIG. 1 exemplarily illustrates an electrode structure that may be driven by using an active matrix addressing scheme, and the pixel electrodes 30R, 30G, and 30B may be driven by using an appropriate switching element 50, for example, a metal-oxide semiconductor (MOS) thin film transistor. The switch element 50 may include a semiconductor layer 50A having a channel region and source/drain regions, a gate electrode 50G, and a gate insulating film 50I disposed between the semiconductor layer 50A and the gate electrode 50G.

The switch element 50 and each of the pixel electrodes 30R, 30G, and 30B may be electrically connected to each other through a drain electrode 50D, and a source electrode 50S may be electrically connected to a data line (not shown). When the gate electrode 50G and the source electrode 50S are arranged in an array of a plurality of rows and a plurality of columns, an active matrix suitable for obtaining multi-colors is realized. Alternatively, as is well known in the art, a simple electrode structure for a static drive method using segments may be within the scope of the present invention. If necessary, a driving member may be formed on the upper substrate 20, and the common electrode 30c may be controlled as an individual electrode by being connected to the driving member.

At least one of the electrodes 30R, 30G, 30B, and 30c may be a transparent electrode. For example, in FIG. 1, the common electrode 30c of the upper electrode 20 that provides a visual surface to an observer 1 is a transparent electrode. Also, in order to implement a transmissive display device, the pixel electrodes 30R, 30G, and 30B may also be transparent electrodes. Each of the transparent electrodes may be formed of, but is not limited to, any one of a transparent metal oxide such as indium-tin-oxide (ITO), fluorinated tin oxide (FTO), indium oxide (IO), or tin oxide ($SnO_2$), a transparent conductive resin such as polyacetylene, and a conductive resin including fine conductive metal particles, or a combination thereof. Electrically insulating protective films 70a and 70b for protecting the electrodes 30R, 30G, 30B, and 30c may be formed on the electrodes 30R, 30G, 30B, and 30c.

A plurality of color capsules 40R, 40G, and 40B which may be collectively denoted by 40 and constitute the first through third subpixels are disposed between the lower substrate 10 and the upper substrate 20. The color capsules 40R, 40G, 40B may be arranged as a single layer. Although the color capsules 40 have spherical shapes in FIG. 1, the color capsules 40 may each have a fan-like cross-sectional shape which has a surface whose projection area increases closer to the upper substrate 20 and decreases closer to the lower substrate 10. Alternatively, the color capsules 40 may each have a rectangular parallelepiped cross-sectional shape.

Each of the plurality of color capsules 40 stores therein a dielectric fluid 41 and electrophoretic particles 42 having at least one color and dispersed in the dielectric fluid 41. The dielectric fluid 41 and the electrophoretic particles 42 are encapsulated in a capsule shell 43. The capsule shell 43 may be formed by, but is not limited thereto, an encapsulation reaction such as a chemical process such as emulsion polymerization, interfacial polymerization, or in-situ polymerization, a physical process such as co-extrusion or phase separation, or a simple/complex coacervation.

Materials of the capsule shell 43 formed by using the simple coacervation may include, but are not limited to, a cellulose-based derivative such as gelatin, polyvinyl alcohol, polyvinyl acetate, or carboxymethyl cellulose. Materials of the capsule shell 43 formed by using the complex coacervation may include, but are not limited to, gelatin, acacia, caragenan, carboxymethyl cellulose, hydrolyzed styrene anhydride copolymer, agar, casein, albumin, and cellulose phthalate. Materials of the capsule shell 43 formed by using the phase separation may include, but are not limited to, polystyrene, polymethyl methacrylate (PMMA), polyethyl methacrylate, polybutyle methacrylate, ethyl cellulose, and polyvinyl pyridine. Materials of the capsule shell 43 formed by using the insitu polymerization may include, but are not limited to, polyhydroxyamide, melamine, urea, soluble oligomers, and vinyl monomers such as styrene and methyl methacrylate (MMA). Also, materials of the capsule shell 43 formed by using the interfacial polymerization may include, but are not limited to, sebacoyl, adipoyl, diamine, polyamine, alcohol, and isocyanate.

Materials of the capsule shell 43 formed by using the emulsion polymerization may include, but are not limited to, styrene, vinyl acetate, acrylic acid, butyl acrylate, t-butyl acrylate, methyl methacrylate, and methacrylate. Alternatively, the capsule shell 43 may be formed of water-soluble polymers, water-dispersed polymers, oil-soluble polymers, a thermosetting resin, a thermoplastic resin, or an ultraviolet (UV) or radiation curable resin.

A color of the color capsule shell 43 may be produced by using dyes, pigments, or a combination of dyes and pigments of a corresponding color included in the capsule shell 43. Alternatively, after a transparent capsule shell is formed, a color of the capsule shell 43 may be produced. Alternatively, a color of the color capsule shell 43 may be produced by additionally forming on the capsule shell 43 a coating layer of a corresponding color. A process of producing a color of the color capsule shell 43 will be explained below.

The capsule shells 43 of the plurality of color capsules 40 may have colors corresponding to the first, second, and third subpixels. For example, in order to obtain multi-colors by using a red/green/blue (RGB) color system, the first through third subpixels may be a red pixel, a green pixel, and a blue pixel, respectively. In this case, the capsule shells 43 of the color capsules 40R of the first subpixel are red. Likewise, the capsule shells 43 of the color capsules 40G of the second subpixel and the color capsules 40B of the third subpixel may be green and blue, respectively.

Alternatively, the EPD device 100 may obtain multi-colors by using a cyan/magenta/yellow (CMY) color system. In this case, the capsule shells 43 of the color capsules 40 of the first through third subpixels may be cyan, magenta, and yellow, respectively.

The dielectric fluid 41 encapsulated in the capsule shell 43 is a fluid having high resistance. The dielectric fluid 41 may be a single fluid or a mixture of two or more fluids. The dielectric fluid 41 may be prepared such that a specific gravity of the dielectric fluid 41 is substantially equal to a specific gravity of the electrophoretic particles 42 dispersed in the dielectric fluid 41.

The dielectric fluid 41 may be a non-aqueous solution or a non-polar liquid. For example, the dielectric fluid 41 may be a hydrocarbon-containing solution such as decahydronaphthalene (DECALIN), 5-ethylidene-2-norbornene, fatty acid ester, or paraffin oil, an aromatic hydrocarbon-containing solution such as toluene, xylene, phenylxylyethane, dodecylbenzene, or alkylnaphthalene, or a halogenated solution such as perfluorodecalin, perfluorotoluene, perfluoroxylene, dichlorobenzotrifluoride, 3,4,5-trichlorobenzotrifluoride, chloropentafluro-benzene, dichlorononane, pentachlorobenzene, or tetrachloroethylene. In addition to the electrophoretic particles 42, any of various functional additives such as a charge-controlling agent, a cationic or anionic ion surfactant, a metallic soap, a resin material, a metal-based binder, and a stabilizing agent may be added to the dielectric fluid 41.

The electrophoretic particles 42 dispersed in the dielectric fluid 41 may be positively or negatively charged, and may be formed of solid pigments, dyed particles, or a combination of at least one of the solid pigments and the dyed particles and polymers. For example, the combination of the pigments and the polymers may be obtained by, but is not limited to, coating the pigments on polymer particles or mixing the pigments and the polymers in an appropriate ratio.

The electrophoretic particles 42 may be light-absorbing electrophoretic particles as shown in FIG. 1. For example, the light-absorbing electrophoretic particles may be black electrophoretic particles such as aniline black, carbon black, or titanium black particles.

Alternatively, the EPD device 100 may have a rib structure 60 that defines subpixels. In this case, the color capsules 40R, 40G, and 40B having different colors may be separated from one another by the rib structure 60. Alternatively, the rib structure 60 may be omitted.

Unlike in FIG. 1, the rib structure 60 may be further formed to define a unit color pixel. When the capsules 40 are disposed as a single layer, a height of the rib structure 60 may be substantially equal to a diameter of each of the capsules 40. A color of the rib structure 60 may be, but is not limited to, white, or black to function as a black matrix.

The color capsules 40R, 40G, and 40B of the first through third subpixels may be bonded to the lower substrate 20 by using an adhesive member 80 such as an adhesive layer or a binder. Alternatively, the color capsules 40R, 40G, and 40B may be respectively bonded to the first through third subpixels through self-assembly by coating a predetermined receptor compound on each of the first through third subpixels and forming a functional group which may specifically bind to the receptor compound on a surface of the capsule shell 43, which will be explained in detail with reference to FIGS. 5 through 7.

The EPD device 100 may further include a reflective film 91 that is disposed between the color capsules 40 and the lower substrate 10. Accordingly, when the EPD device 100 is a reflective display device, the display quality of the EPD device 100 may be improved. Also, in this case, the EPD device 100 may further include a front illumination member 92 that includes a light source 92a such as a light-emitting diode (LED) and a light guide plate 92b. Alternatively, when the EPD device 100 is a transmissive display device, a light source may be further disposed adjacent to the lower substrate 10.

A method of driving the EPD device 100 of FIG. 1 will now be explained. For convenience of explanation, it is assumed that the electrophoretic particles 42 are black electrophoretic particles which are positively charged, the first through third subpixels constituting the unit color pixel are respectively red, green, and blue subpixels, and the EPD device 100 is a reflective display device.

When a scan signal is received through the gate electrode 50G and a data signal is received through the source electrode 50S, a predetermined electric field may be formed between the pixel electrodes 30R, 30G, and 30B and the common electrode 30c. For example, a positive potential may be applied to the pixel electrode 30R of the first subpixel, a negative potential may be applied to the pixel electrodes 30G and 30B of the second and third subpixels, and a ground potential may be applied to the common electrode 30c. In this case, an electric field directed from the lower substrate 10 toward the upper substrate 20 is formed in the first subpixel, and an electric field from the upper substrate 20 toward the lower substrate 10 is formed in the second and third subpixels. FIG. 1 illustrates a distribution of the black electrophoretic particles 42 due to the electric fields.

In the red subpixel (that is, in the first subpixel), light i1 incident through the light guide plate 92b is absorbed by the black electrophoretic particles 42. As a result, light reflected by the red subpixel is turned off. However, light i2 and light i3 incident through the light guide plate 92b are respectively reflected as reflected light r2 and reflected light r3 by the green subpixel (that is, the second subpixel) and the blue subpixel (the third subpixel), and the reflected light r2 and the reflected light r3 are turned on. In this case, an observer 1 may observe a color obtained by mixing the reflected light r2 which is green light and the reflected light r3 which is blue light. Although only the first subpixel which is the red subpixel is turned off in FIG. 1, it will be understood by one of ordinary skill in the art that 8-bit multi-colors may be obtained by turning on/off the first through third subpixels, and when a plurality of pixel electrodes are provided in one subpixel, gradation may be achieved.

Figure 2B:
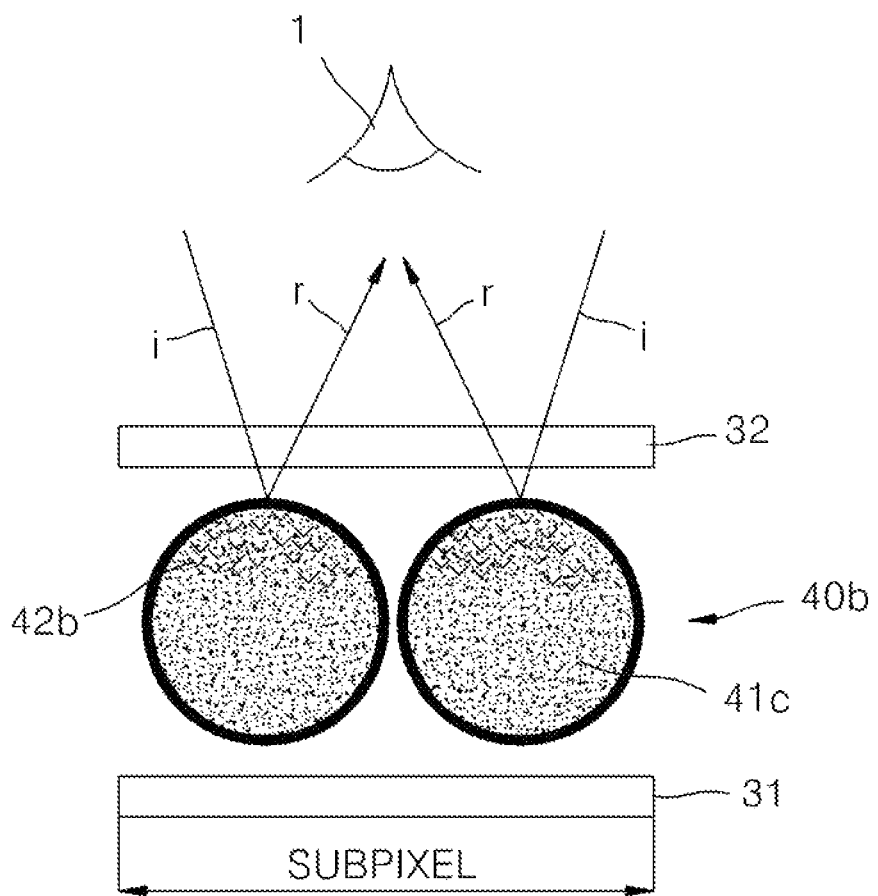

FIGS. 2A and 2B are cross-sectional views illustrating subpixels applicable to the EPD device 100 of FIG. 1, according to embodiments of the present invention.

Referring to FIG. 2A, a subpixel includes a pixel electrode 31 and a common electrode 32 which face each other. Color capsules 40a disposed between the pixel electrode 31 and the common electrode 32 may include the capsule shells 43 having predetermined colors such as red, blue, and green, or cyan, magenta, and yellow, instead of an achromatic color as described in FIG. 1. However, in FIG. 2A, reflective electrophoretic particles 42b as well as light-absorbing electrophoretic particles 42a are further included in the dielectric fluid 41 of each of the color capsules 40a.

The reflective electrophoretic particles 42b may be white particles and may include, for example, titanium dioxide, antimony trioxide, zinc sulfide, zinc oxide, or calcium carbonate ($CaCO_3$).

In an embodiment, the reflective electrophoretic particles 42b may be electrically neutral. Alternatively, the reflective electrophoretic particles 42b may have polarity opposite to polarity of the light-absorbing electrophoretic particles 42b. In this case, under the same electric field, the reflective electrophoretic particles 42b show opposite mobilities to those of the light-absorbing electrophoretic particles 42b.

FIG. 2A illustrate a distribution of the light-absorbing electrophoretic particles 42a and the reflective electrophoretic particles 42b when the light-absorbing electrophoretic particles 42a have positive polarity and the reflective electrophoretic particles 42b have negative polarity and an electric field directed from the common electrode 32 toward the pixel electrode 31 is formed. In the subpixel of FIG. 2A, incident light i is reflected as reflected light r by the reflective electrophoretic particles 42b in the color capsules 40a and the reflected light r is turned on, and the observer 1 may observe light of a wavelength range corresponding to colors of the color shells 43. When polarity of the pixel electrode 31 and the common electrode 32 are reversed, the reflected light r may be turned off. In FIG. 2A, since not only the light-absorbing electrophoretic particles 42a and the reflective electrophoretic particles 42b help light to be turned on/off, the contrast of displayed information may be improved.

Referring to FIG. 2B, color capsules 40b may include a light-absorbing dielectric fluid 41c in which black dyes and/or pigments are dispersed, instead of the light-absorbing electrophoretic particles 42a. A subpixel of FIG. 2B may further include the reflective electrophoretic particles 42b to switch the reflected light r.

FIG. 2B illustrates a distribution of the reflective electrophoretic particles 42b when the reflective electrophoretic particles 42b have negative polarity and an electric field directed from the common electrode 32 toward the pixel electrode 31 is formed. Like in FIG. 2A, contrast may be improved due to the light-absorbing dielectric fluid 41c and the reflective electrophoretic particles 42b.

Figure 3A:
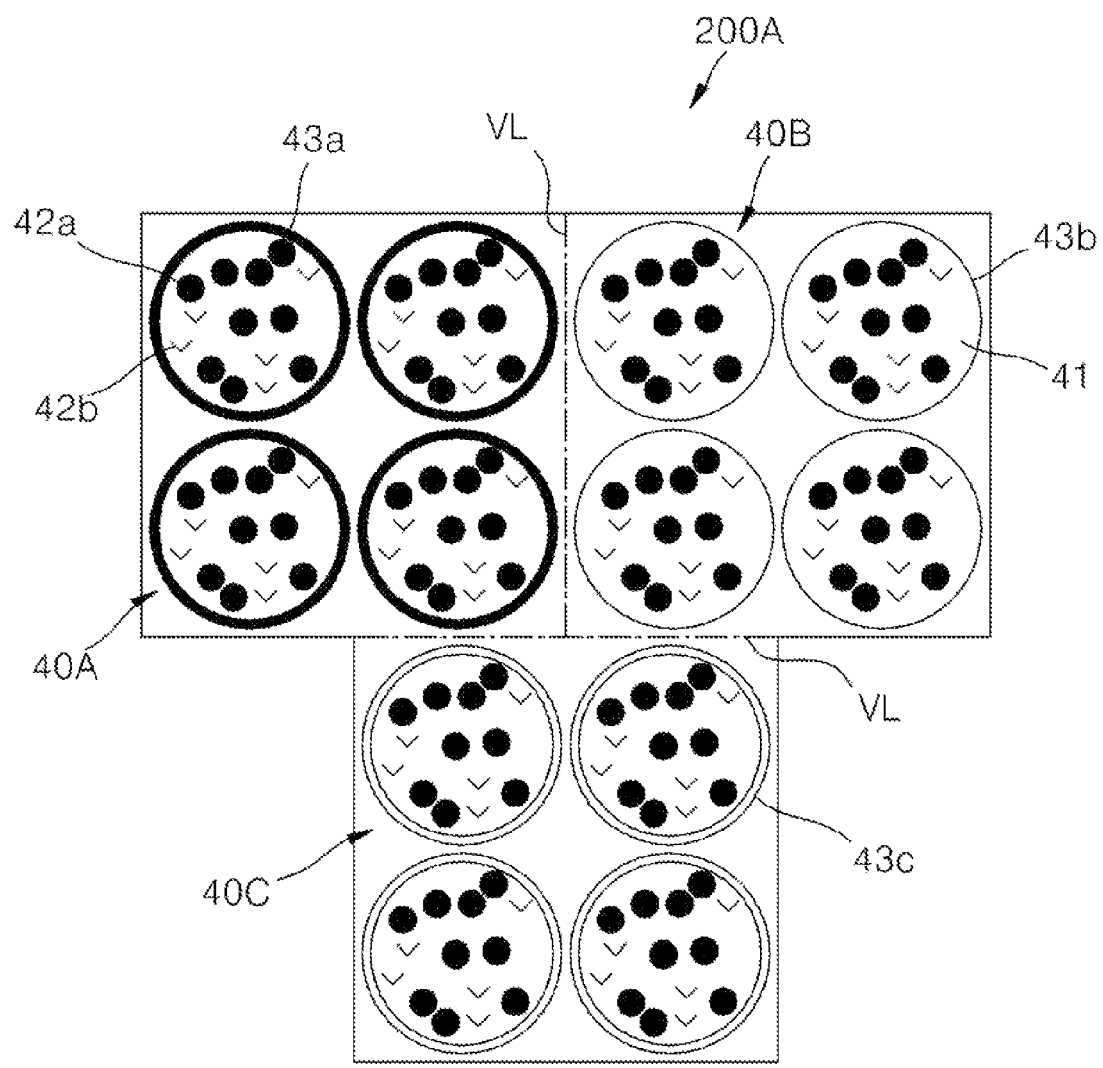

FIGS. 3A and 3B are top views illustrating unit color pixels 200A and 200B according to embodiments of the present invention.

A unit color pixel may include two or more subpixels in which a plurality of color capsules are arranged in a two-dimensional (2D) manner. FIGS. 3A and 3B illustrate that three types of color capsules 40A, 40B, and 40C including capsule shells 43a, 43b, and 43c of different colors are arranged in a 2D manner.

The subpixels are defined in each of the unit color pixels 200A and 200B divided by a virtual line VL that is indicated by a dash-dotted line. The subpixels may have the same size or different sizes in consideration of display quality such as color saturation and contrast. Also, the subpixels may be separated by the rib structure 60 that is disposed at a position of the virtual line VL as described above with reference to FIG. 1.

Although the subpixels have rectangular parallelepiped shapes in FIGS. 3A and 3B, the present embodiment is not limited thereto. For example, the subpixels may have spherical shapes, oval shapes, or arbitrary polygonal shapes such as triangular shapes or pentagonal shapes. Alternatively, the subpixels may have stripe or meander shapes continuously formed over an adjacent unit color pixel. Likewise, the unit color pixels 200A and 200B may have spherical shapes, oval shapes, polygonal shapes such as triangular shapes or pentagonal shapes, stripe shapes, or meander shapes in which the subpixels are arranged in a 2D manner, The color capsules 40A, 40B, and 40C arranged in each subpixel may be red color capsules, green color capsules, and blue color capsules. Alternatively, the plurality of color capsules 40A, 40B, and 40C may be, for example, cyan color capsules, magenta color capsules, and yellow color capsules.

At least one type of electrophoretic particles for switching light, that is, at least one type of particles of the light-absorbing electrophoretic particles 42a and the reflective electrophoretic particles 42b, are dispersed in the dielectric fluid 41 of each of the color capsules 40A, 40B, and 40C as described above. Also, as described above with reference to FIG. 2B, each of the color capsules 40A, 40B, and 40/c may include reflective electrophoretic particles and a dielectric fluid in which any one or all of light-absorbing pigments and dyes are dispersed instead of a transparent dielectric fluid.

Referring to FIG. 3B, the unit color pixel 200B may further include a subpixel including transparent capsules 40D including a transparent shell 43d, as well as subpixels including the plurality of color capsules 40A, 40B, and 40C. Particles in the transparent shell 43d may include reflective electrophoretic particles or light-absorbing electrophoretic particles, or both as described above. Due to a light-switching operation of the transparent capsules 40D, an independent subpixel showing an achromatic color may be provided, and thus achromatic color rendition of the unit color pixel 200B may be further improved.

Alternatively, particles in the transparent shell 43d may be chromatic electrophoretic particles, instead of achromatic electrophoretic particles. The subpixel including the chromatic electrophoretic particles may complement or replace the subpixels including the color capsules 10A, 40B, and 40C.

Method of Fabricating Multi-Color EPD Device

Figure 4:
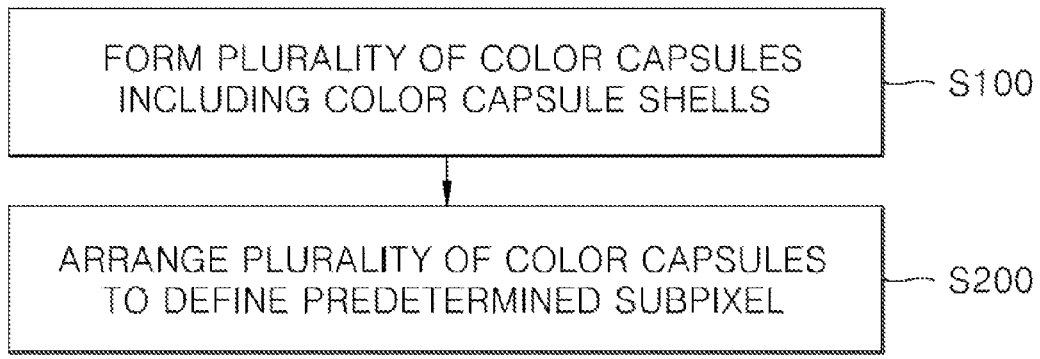
FIG. 4 is a flowchart illustrating a method of fabricating an EPD device which is a multi-color EPD device, according to an embodiment of the present invention.

FIG. 4 is a flowchart illustrating a method of fabricating an EPD device which is a multi-color EPD device, according to an embodiment of the present invention.

Referring to FIG. 4, in operation S100, a plurality of color capsules including capsule shells having colors are formed. For example, a color of a color capsule shell may produced by dyes or pigments of a corresponding color included in the capsule shell or by a combination of the dyes and pigments.

To this end, a first phase inner fluid including a dielectric fluid in which at least one type of electrophoretic particles are dispersed is prepared. Also, a second phase encapsulated fluid in which dyes and pigments for producing a corresponding color of the capsule shell or a combination of the dyes and the pigments are dispersed is prepared. The second phase is different from the phase. Next, a predetermined encapsulation reaction is induced between the encapsulated fluid and the inner fluid, to form a plurality of color capsules in which a part of the first phase fluid and some of the at least one type of electrophoretic particles are encapsulated. The color capsules include color shells whose colors are produced by the dyes or pigments dispersed in the second phase encapsulated fluid.

Alternatively, a transparent capsule shell may be first formed, and then a color of the transparent capsule shell may be produced to have a corresponding color. For example, a first phase inner fluid including a dielectric fluid in which at least one type electrophoretic particles are dispersed is prepared. Also, a second phase encapsulated fluid in which a compound having a functional group that may react with dyes of a color is included. The second phase is different from the first phase. Next, a predetermined encapsulation reaction is induced between the encapsulated fluid and the inner fluid, to form a plurality of capsules in which a part of the inner fluid and some of the at least one type of electrophoretic particles are encapsulated. The functional group is exposed on surfaces of the capsules. Next, the dyes react with the functional group exposed on the surfaces of the capsule shells to produce colors of the capsule shells, thereby completely fabricating the plurality of color capsules.

Alternatively, a coloring coating layer having pigments of the corresponding color is formed by using drying or wet coating on outer surfaces of capsules including transparent capsule shells, thereby completely fabricating the plurality of color capsules.

Referring back to FIG. 4, once the plurality of color capsules are completed, in operation S200, the plurality of color capsules having the corresponding color are arranged to define a predetermined subpixel of a color pixel on a substrate. When subpixels of different colors are required in a unit color pixel, a process of arranging color capsules having a corresponding color for each subpixel may be repeatedly performed as will be described below.

FIGS. 5A through 5E are cross-sectional views for explaining a method of arranging color capsules in a plurality of subpixel areas, according to an embodiment of the present invention. For convenience of explanation, although different types of subpixel areas are shown in parallel as shown in FIG. 1, the subpixel areas may have various other 2D patterns such as circular, oval, polygonal, and meander patterns as described above.

Figure 5A:
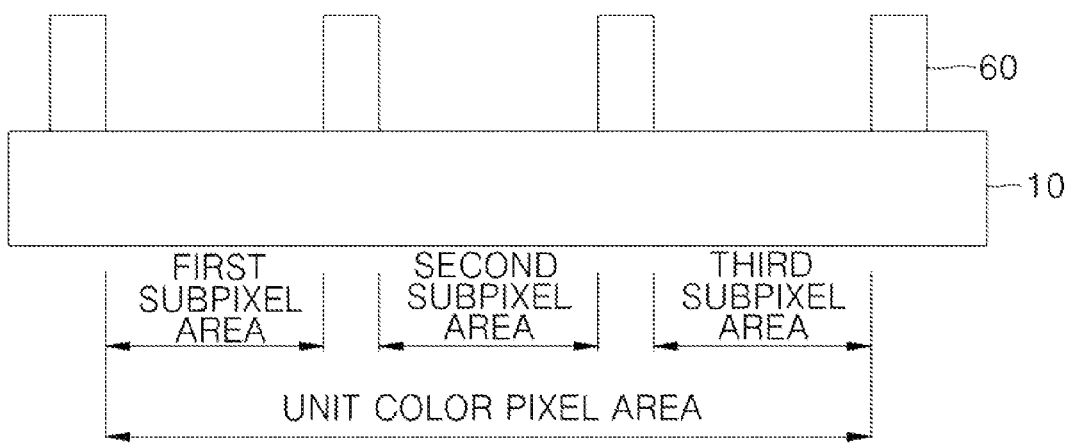
FIGS. 5A through 5E are cross-sectional views for explaining a method of arranging color capsules in a plurality of subpixel areas, according to an embodiment of the present invention.
Figure 8:
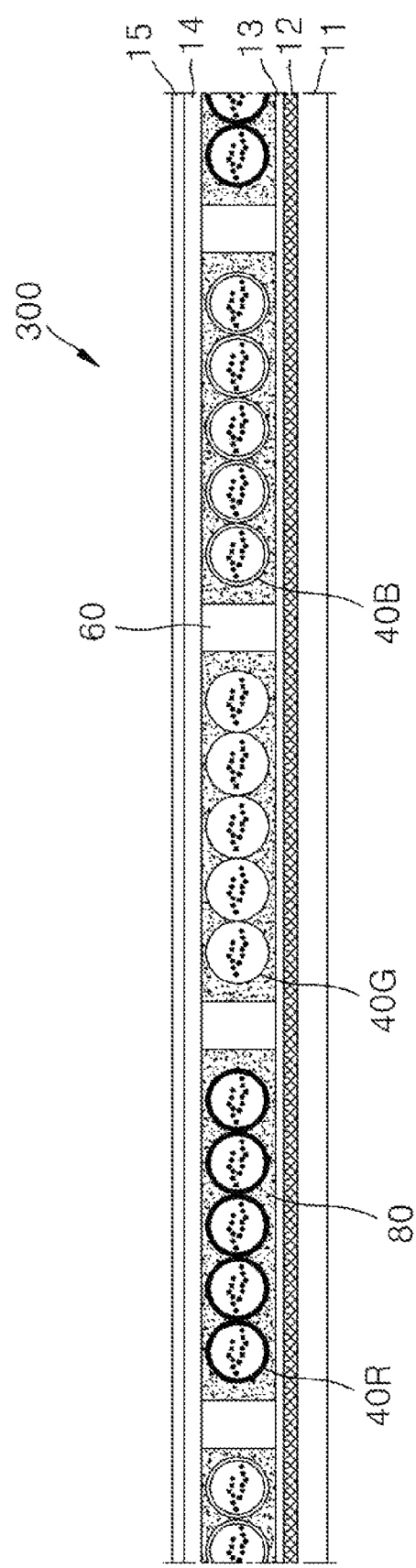
FIG. 8 is a cross-sectional view illustrating an image sheet according to an embodiment of the present invention.

Referring to FIG. 5A, the substrate 10 is provided. The substrate 10 may be, for example, a lower substrate on which a pixel electrode (not shown) is formed, or an appropriate support substrate as shown in FIG. 8. The substrate 10 may include two or more subpixel areas. Also, the rib structure 60 for defining subpixel areas, a unit color pixel, or all of the subpixel areas and the unit color pixel may be formed on the substrate 10.

The rib structure 60 may be, for example, a pattern whose mechanical strength is high such as a silicon oxide formed by using photolithography and etching or a patterned photoresist formed by using photolithography. When color capsules are arranged as a single layer, a height of the rib structure 60 may be substantially equal to a height of each of color capsules.

Figure 5B:
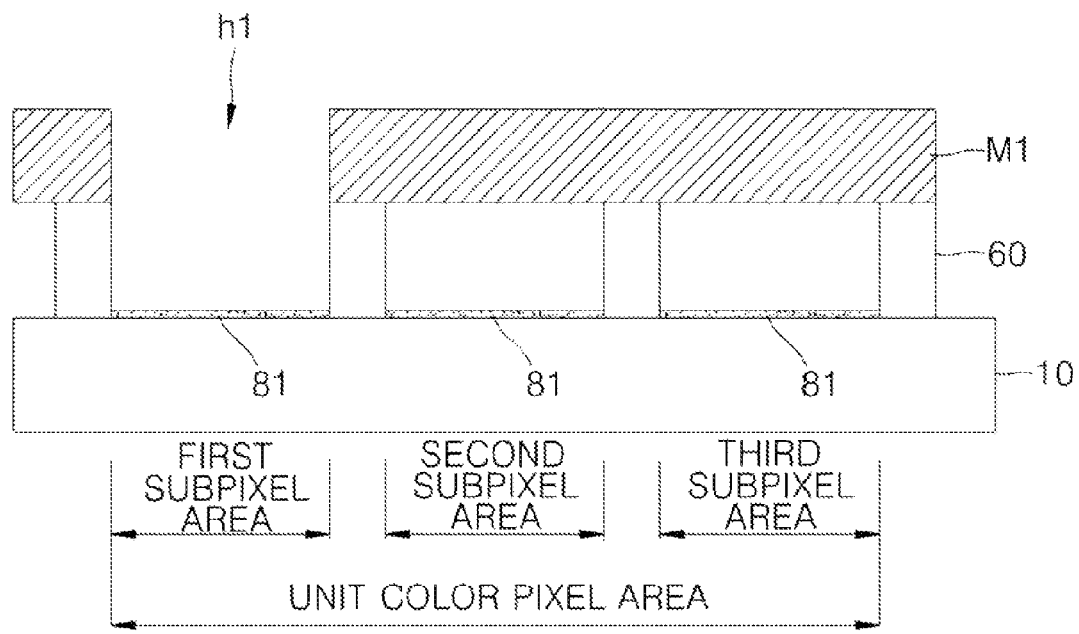
Figure 5C:
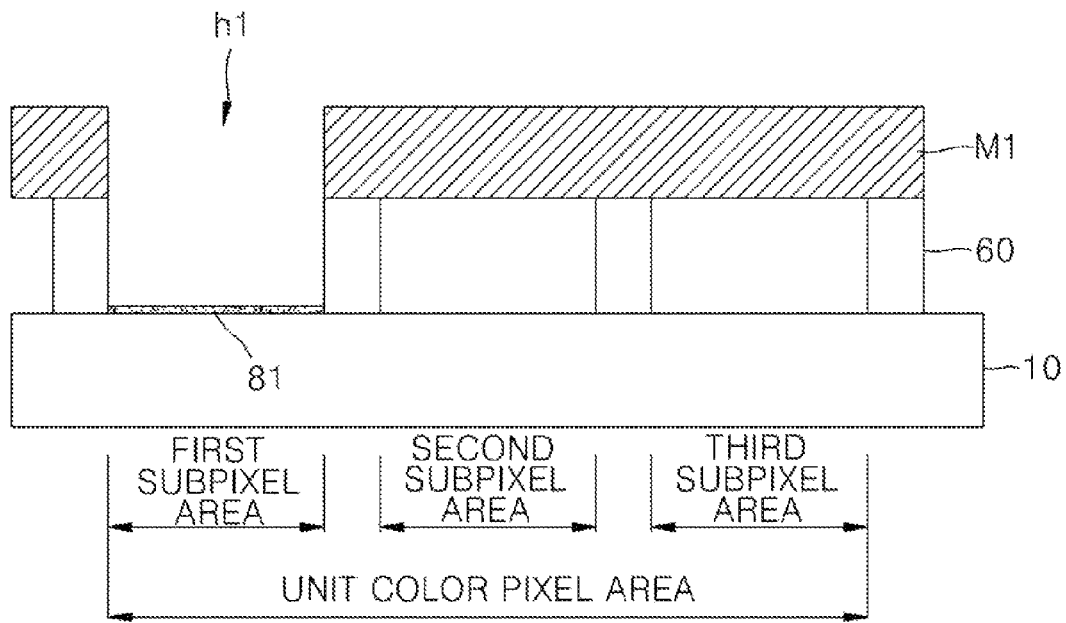

Referring to FIGS. 5B and 5C, an adhesive layer 81 is coated in each subpixel area of the substrate 10 to which color capsules are to be bonded. As shown in FIG. 5B, the adhesive layer 81 may be coated on all subpixels before a mask pattern M1 is formed. As shown in FIG. 5C, the adhesive layer 81 may be selectively coated only in a subpixel area exposed by an opening h1 after a mask pattern M2 is formed, and may be coated to another subpixel area while being alternately performed with a step of charging the color capsules as will be described below. The adhesive layer 81 may be formed of, but is not limited to, any one of acrylate copolymer, ethylenevinylacetate copolymer, polycarbonate, and styrene copolymer, or a combination thereof.

A process of bonding the color capsules and the substrate 10 will be explained with reference to FIG. 5C. Referring back to FIG. 5C, the mask pattern M1 having the opening h1 through which a predetermined subpixel area, for example, a first subpixel area, in which a plurality of color capsules are to be filled is exposed is formed over the substrate 10 on which the adhesive layer 81 is coated.

Figure 5D:
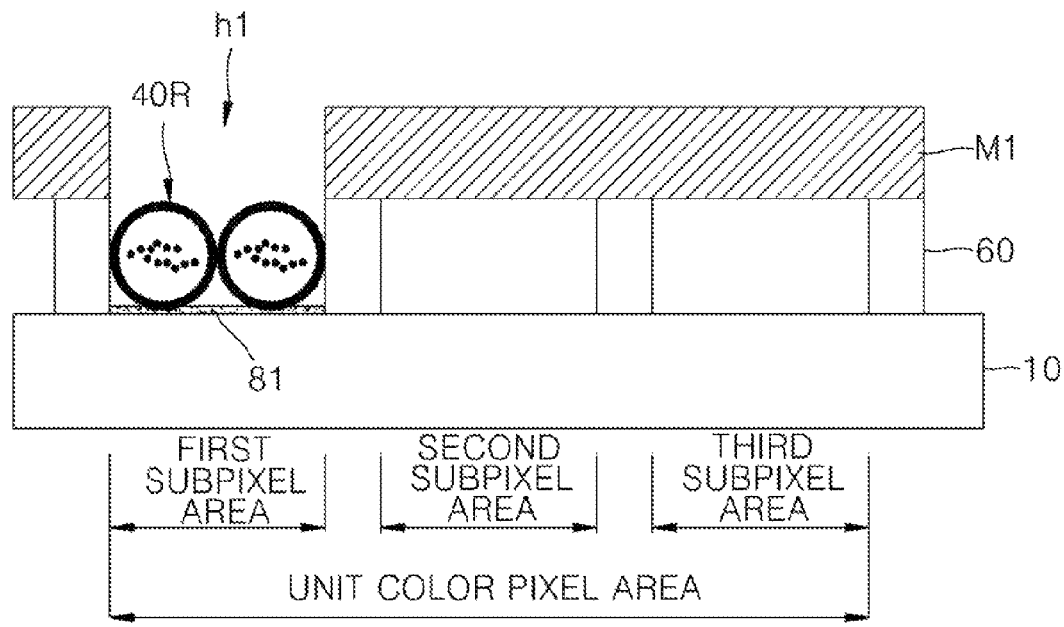

Next, as shown in FIG. 5D, the color capsules 40R having a predetermined color, for example, a red color, are filled in the first subpixel area exposed through the opening h1 of the mask pattern M1. The color capsules 40R may be filled in the first subpixel area by using a coating unit such as a doctor blade. In order to increase mobilities of the color capsules 40R, an ultrasonic oscillation may be applied to the substrate 10 and/or the color capsules 40R.

Next, the adhesive layer 81 and the color capsules 40R are boned to each other. A process of bonding the adhesive layer 81 and the color capsules 40R may be performed by using chemical energy such as crosslinking using UV radiation, or thermal or mechanical pressure.

Alternatively, in order to bond the capsules 40R to the substrate 10, a binder 80 (see FIG. 8) may be used as an adhesive member. For example, the binder 80 and the capsules 40R are dispersed in a fluid, and the fluid is coated on the substrate 10 by using, for example, a doctor blade and/or ultrasound waves. As a result, the fluid including the capsules 40R and the binder 80 is filled in the first subpixel area. Next, predetermined thermal, mechanical, or chemical energy is applied to the binder 80 coated on the substrate 10 to cure the binder 80, thereby bonding the capsules 40 and the substrate 10. The binder 80 may include, for example, an ultraviolet curable monomer mixture, a photo-initiator, or a light amplifier.

Figure 5E:
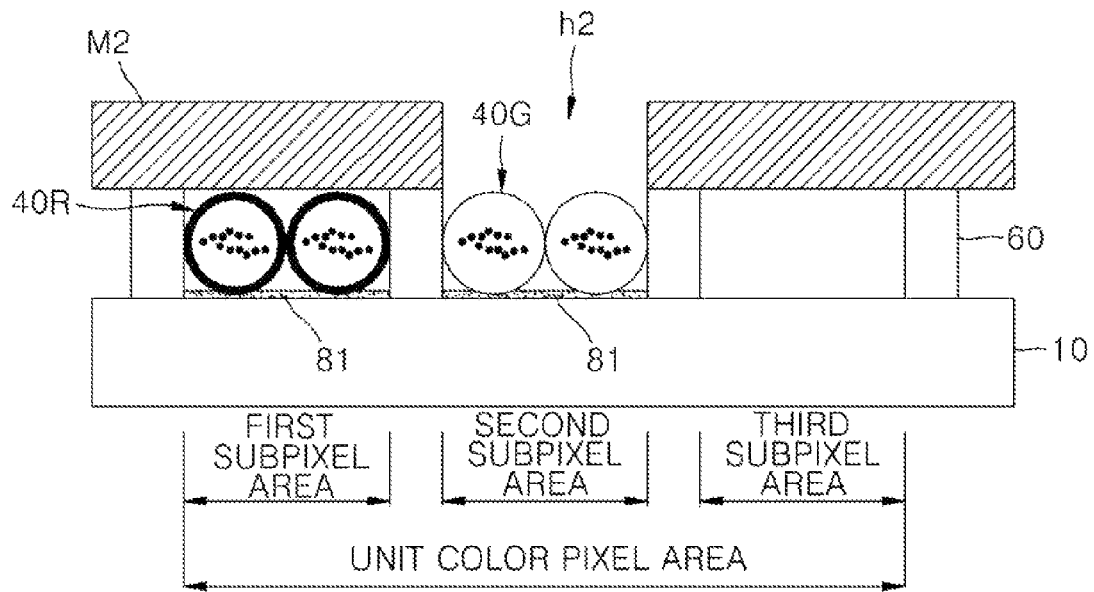

Referring to FIG. 5E, the mask pattern M2 having an opening h2 through which a different subpixel area, for example, a second subpixel area, is exposed is formed on a resultant structure. Next, color capsules having a predetermined color, for example, the color capsules 40G having green color shells, are filled in the second subpixel area exposed through which the opening h2 of the mask pattern M2. Next, the color capsules 40G and the substrate 10 are bonded by using a bonding member such as the adhesive layer 81 or a binder. Likewise, a process of forming a mask pattern and a process of filling blue color capsules are repeatedly performed for a third subpixel area, thereby completing a color pixel array including unit color pixels.

Figure 6:
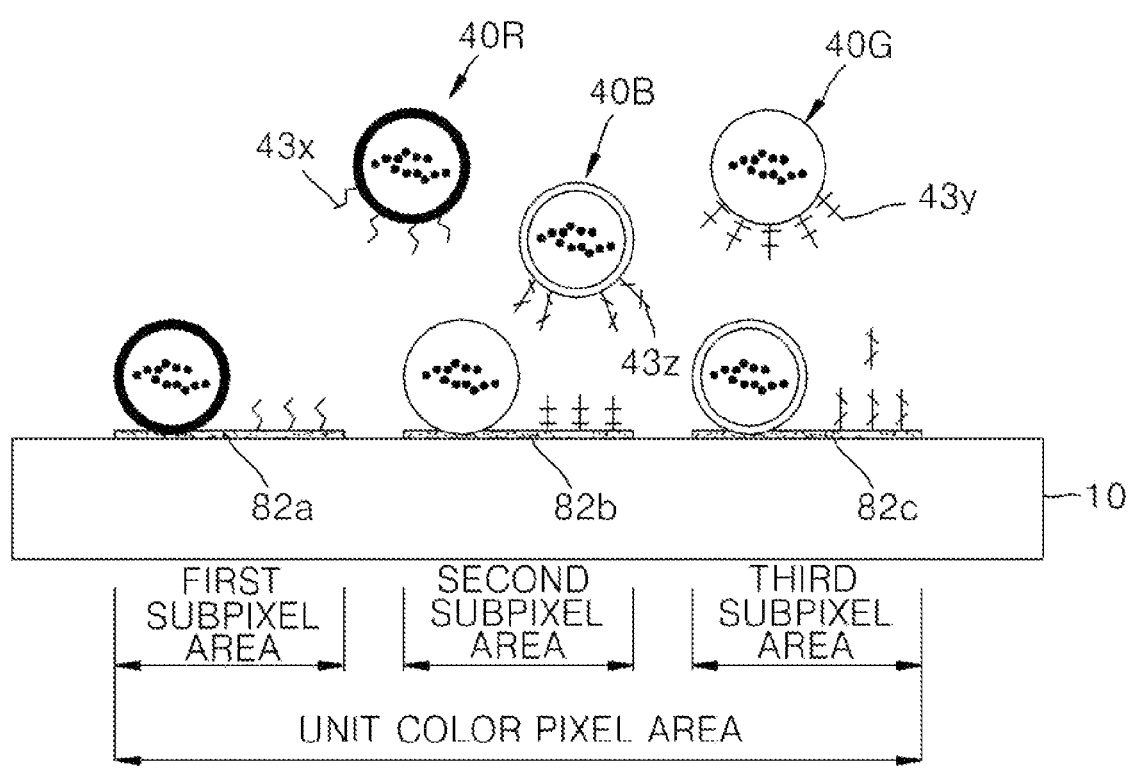
FIG. 6 is a cross-sectional view illustrating a process of arranging color capsules in a plurality of subpixel areas, according to another embodiment of the present invention.

FIG. 6 is a cross-sectional area for explaining a process of arranging color capsules on a plurality of subpixels, according to another embodiment of the present invention.

In FIG. 6, color capsules are disposed on a subpixel through self-assembly. To this end, different types of receptor compounds and a compound having a functional group that may perform self-assembly by specifically binding to each of the different types of receptor compounds are selected. Examples of a combination of the receptor compound and the functional group may include an isocyanate group/amine group, isocyanate group/hydroxyl group, epoxy/carboxylic acid group, acid/base, and cationic group/anionic group. Primary binding occurs due to a chemical reaction when the receptor compound and the functional group contact each other, and self-assembly is completed due to an acid/base reaction and an ion interaction.

In order to arrange color capsules through self-assembly, different types of receptor compound pattern layers 82a, 82b, and 82c which may specifically bind are coated in corresponding subpixel areas on the substrate 10. Next, the color capsules 40R, 40G, and 40B including color capsule shells having functional groups 43x, 43y, and 43z which specifically bind respectively to receptor compounds are coated on the substrate 10. A process of coating the color capsules 40R, 40G, and 40B may be performed by using a coating process using dry, wet, or spray coating. In order to increase mobilities of the color capsules 40R, 40G, and 40B, an ultrasonic oscillation may be applied to a fluid including the color capsules 40R, 40G, and 40B, or the substrate 10.

The color capsules 40R, 40G, and 40B having the functional groups 43x, 43y, and 43z move over the substrate 10 and selectively bind respectively to the receptor compound pattern layers 82a, 82b, and 82c, thereby completing a color pixel array. Due to self-assembly, a patterning process for forming a mask pattern which is repeatedly performed may be omitted, unlike in FIGS. 5A through 5E.

Figure 7:
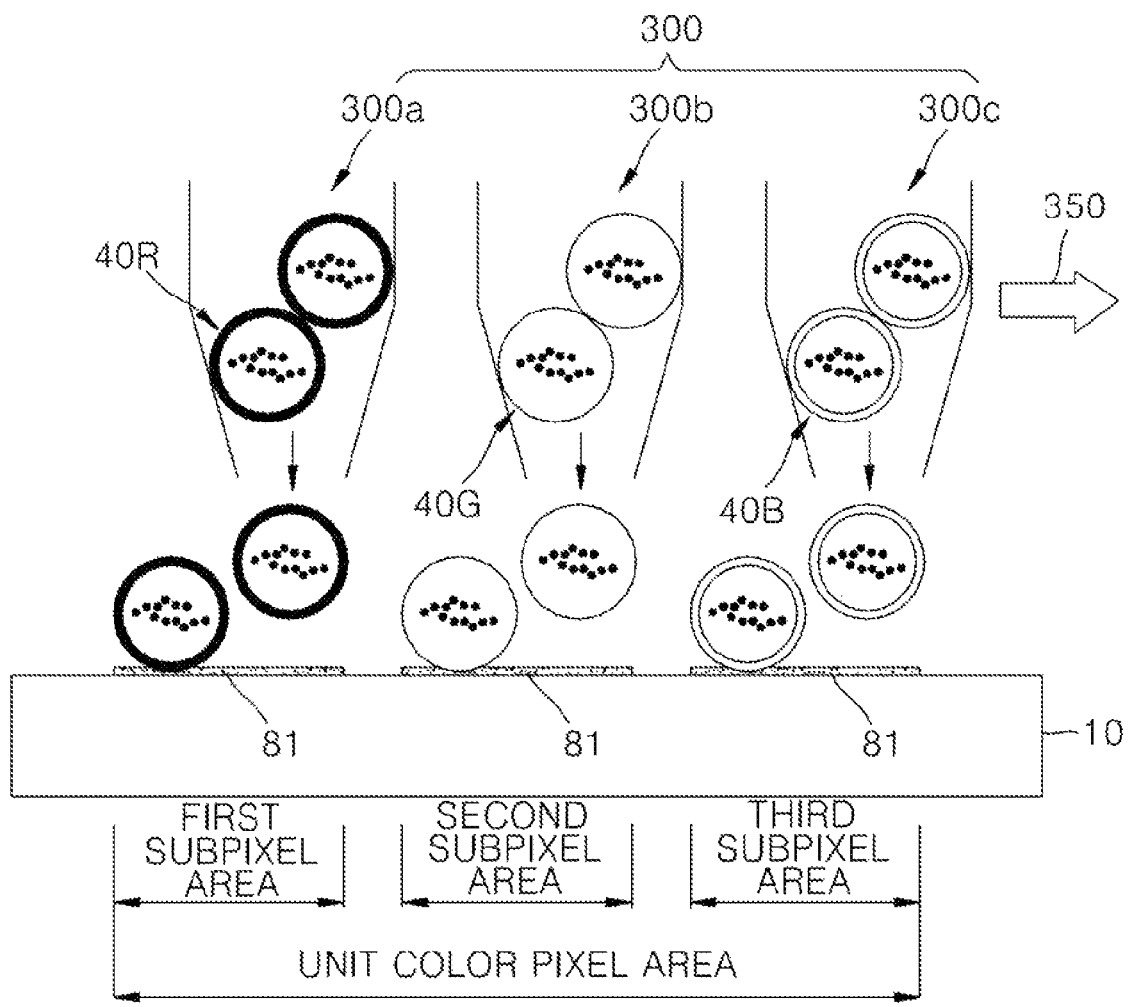
FIG. 7 is a cross-sectional view illustrating a process of arranging color capsules in a plurality of subpixel areas, according to another embodiment of the present invention.

FIG. 7 is a cross-sectional view for explaining a process of arranging color capsules on a plurality of subpixels, according to another embodiment of the present invention.

Referring to FIG. 7, a printing device 300 including nozzles 300a, 300b, and 300c through which color capsules having different types of colors may be sprayed to desired positions is used. The printing device 300 sequentially moves in a direction indicated by an arrow 350, and the color capsules 40R, 40G, and 40B are continuously arranged on the substrate 10. When the printing device 300 is used, a process of forming a mask pattern which is repeatedly performed may be omitted, like in FIG. 6.

In FIGS. 5A through 7, it will be understood that an adhesive layer, a binder, and self-assembly may be compatibly or a combination of the adhesive layer, the binder, and the self-assembly may be used. Also, the term 'coating' does not limit the scope of the present invention, and coating may be used to have the same meaning as printing. For example, a coating process includes any type of printing and coating processes such as patch dye coating; slot or extrusion coating; slide or cascade coating; curtain coating; roll coating; gravure coating; dip coating; spray coating; meniscus coating; spin coating; brush coating; air knife coating; silk screen printing; electrostatic printing; and thermal printing.

As described above, after corresponding color capsules are arranged in all subpixel areas, as shown in FIG. 1, the upper substrate 20 on which the common electrode 30c is formed is fixedly attached to the lower substrate 10, thereby completing a multi-color EPD device.

Image Sheet and Method of Fabricating the Same

FIG. 8 is a cross-sectional view illustrating an image sheet 300 according to an embodiment of the present invention. Although color capsules are disposed on a lower substrate on which pixel electrodes are formed in FIGS. 5 through 7, the color capsules may be disposed on an upper substrate to obtain a resultant structure, and the resultant structure may be overturned and may be coupled to the lower substrate on which the pixel electrodes for driving the color capsules are formed, thereby obtaining an EPD device.

The image sheet 300 of FIG. 8 refers to a layer including color capsules which are light converting members used by being coupled to a lower substrate on which a driving element is formed. The image sheet 300 includes a support substrate 11, and two or more types of color capsules 40R, 40G, and 40B arranged on the support substrate 11. An arrangement of the plurality of color capsules 40R, 40G, and 40B and a process of producing a color have been described with reference to FIGS. 5B through 5E. The color capsules 40R, 40G, and 40B may be bonded to the support substrate 11 by using the binder 80. Alternatively, the color capsules 40R, 40G, and 40B may be bonded to the support substrate 11 by using the adhesive layer 81 (see FIG. 1). The color capsules 40R, 40G, and 40B may be separated from one another by the rib structure 60 formed on the support substrate 11.

The support substrate 11 may be a surface exposed to an observer, like the upper substrate 10 of the EPD device of FIG. 1. In this case, the support substrate 11 may be formed of a transparent material as described above. Also, a transparent conductive layer 12 may be formed between the support substrate 11 and the color capsules 40R, 40G, and 40B. The transparent conductive layer 12 may be used as a common electrode 30c (see FIG. 1) of the EPD device. In this case, a protective layer 13 for protecting the transparent conductive layer 12 may be further formed on the transparent conductive layer 12 as described above with reference to FIG. 1.

An adhesive complex layer including an adhesive layer 14 and a release layer 15 disposed on the adhesive layer 14 may be further formed on the color capsules 40R, 40G, and 40B. In order to stack the image sheet 300 on a lower substrate on which pixel electrodes are formed, the release layer 15 may be removed, and the lower substrate and the image sheet 300 may be coupled to each other by using the adhesive layer 14 that is exposed. An intermediate layer having a predetermined wiring structure having a via-hole and a wiring pattern connected through the via-hole may be further disposed between the image sheet 300 and the lower substrate.

Although a counter electrode structure for vertically driving electrophoretic particles has been described in the above embodiments, the present invention is not limited thereto, and a well-known in-plane electrode structure may be used within the scope of the present invention. Although color capsules are used as a member that may replace a color filter, it is obvious that a color filter may be used along with the color capsules in order to improve color rendition.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

Since a multi-color display device according to embodiments of the present invention switches light by using an electrophoretic layer including a plurality of color capsules, the multi-color display device may be realized without a color filter. Thus, the multi-color display device may have high color saturation and high contrast.

Also, an image sheet according to embodiments of the present invention may implement multi-colors without light loss due to a color filter.

What is claimed is:

1. A multi-color electrophoretic display (EPD) device comprising:
    a plurality of unit color pixels; and
    a plurality of color capsules, each comprising color capsule shell which stores a dielectric fluid and at least one type of electrophoretic particles dispersed in the dielectric fluid, the plurality of color capsules being arranged to define subpixels of each of the plurality of unit color pixels.

2. The multi-color EPD device of claim 1, wherein the electrophoretic particles comprise light-absorbing electrophoretic particles.

3. The multi-color EPD device of claim 2, wherein the electrophoretic particles further comprise reflective electrophoretic particles having polarity opposite to polarity of the light-absorbing electrophoretic particles.

4. The multi-color EPD device of claim 1, wherein the dielectric fluid comprises at least one of light-absorbing pigments and light-absorbing dyes, and
    wherein the electrophoretic particles comprise reflective electrophoretic particles.

5. The multi-color EPD device of claim 1, further comprising a plurality of transparent capsules that comprise transparent shells each of which stores a dielectric fluid and at least one type of electrophoretic particles dispersed in the dielectric fluid,
    wherein the plurality of transparent capsules are arranged adjacent to the subpixels defined by the plurality of color capsules, and define an additional subpixel of the unit color pixel.

6. The multi-color EPD device of claim 5, wherein the plurality of transparent capsules constitute any one of white and black subpixels or a combination of the white and black subpixels.

7. The multi-color EPD device of claim 1, wherein the plurality of color capsules comprise red color capsules, green color capsules, and blue color capsules.

8. The multi-color EPD device of claim 1, wherein the plurality of color capsules comprise yellow color capsules, cyan color capsules, and magenta color capsules.

9. The multi-color EPD device of claim 1, wherein the plurality of color capsules comprise any one of dyes and pigments of a corresponding color in the capsule shell, or a combination of the dyes and the pigments.

10. The multi-color EPD device of claim 1, wherein the plurality of color capsules produce a color due to a reaction between a functional group on a surface of the capsule shell and dyes, or a coloring coating layer on an outer surface of the capsule shell.

11. A method of fabricating a multi-color electrophoretic display (EPD) device comprising a plurality of unit color pixels, the method comprising:
    forming a plurality of color capsules that comprise capsule shells each of which stores a dielectric fluid and at least one type of electrophoretic particles dispersed in the dielectric fluid; and
    arranging the plurality of color capsules on a substrate to define subpixels of each of the unit color pixels.

12. The method of claim 11, wherein the forming of the plurality of color capsules comprises:
    preparing a first phase inner fluid that comprises the dielectric fluid in which the at least one type of electrophoretic particles are dispersed;
    preparing a second phase encapsulated fluid in which at least one of dyes and pigments of a corresponding color in the capsule shell is dispersed,
    wherein the second phase is different from the first phase; and
    forming the plurality of color capsules by inducing an encapsulation reaction between the encapsulated fluid and the inner fluid and encapsulating a part of the first phase fluid and some of the at least one type of electrophoretic particles.

13. The method of claim 12, wherein the first phase inner fluid comprises a non-aqueous solution or a non-polar liquid, and the second phase encapsulated fluid comprises an aqueous solution or a polar liquid.

14. The method of claim 11, wherein the forming of the plurality of color capsules comprises:
    providing a first phase inner fluid that comprises the dielectric fluid in which the at least one type of electrophoretic particles are dispersed;
    providing a second phase encapsulated fluid that comprises a compound having a functional group reacting with dyes of a predetermined color, wherein the second phase is different from the first phase;
    inducing an encapsulation reaction between the encapsulated fluid and the inner fluid such that a part of the inner fluid and some of the at least one type of electrophoretic particles are encapsulated; and
    producing the corresponding color of the capsule shell due to a reaction between the dyes and the functional groups on surfaces of the plurality of capsules.

15. The method of claim 11, wherein the method further comprises:
   providing a first phase inner fluid that comprises the dielectric fluid in which the at least one type of electrophoretic particles are dispersed;
   providing a second phase encapsulated fluid, wherein the second phase is different from the first phase;
   forming a plurality of capsules by inducing an encapsulation reaction between the encapsulated fluid and the inner fluid such that a part of the inner fluid and some of the at least one type of electrophoretic particles are encapsulated; and
   forming a coloring coating layer that produces a corresponding color on an outer surface of each of the capsule shells of the plurality of capsules.

16. The method of claim 11, wherein the arranging of the plurality of color capsules comprises:
   forming on the substrate a mask pattern having an opening through which a corresponding subpixel area is exposed;
   filling the plurality of color capsules having a corresponding color in the exposed subpixel area; and
   bonding the plurality of color capsules to the exposed subpixel area.

17. The method of claim 16, wherein the bonding of the plurality of color capsules comprises bonding the plurality of color capsules by using an adhesive layer disposed between the exposed subpixel area and the plurality of color capsules.

18. The method of claim 16, wherein the bonding of the plurality of color capsules comprises bonding the plurality of color capsules by using a binder included in the fluid in which the plurality of color capsules are dispersed.

19. The method of claim 16, wherein the bonding of the plurality of color capsules comprises bonding the plurality of color capsules through self-assembly between a functional group of the color capsule shell and a receptor compound pattern layer formed on the substrate and the plurality of color capsules.

20. The method of claim 11, wherein the arranging of the plurality of color capsules comprises arranging the plurality of color capsules by using a printing device including two or more nozzles through which the plurality of color capsules are sprayed.

* * * * *